C. YOUNG.
DISK HARROW.
APPLICATION FILED NOV. 20, 1915.

1,189,332.

Patented July 4, 1916.
3 SHEETS—SHEET 2.

INVENTOR
CHESTER YOUNG

BY Francis M. Wright.
ATTY.

C. YOUNG.
DISK HARROW.
APPLICATION FILED NOV. 20, 1915.
1,189,332.
Patented July 4, 1916.
3 SHEETS—SHEET 3.
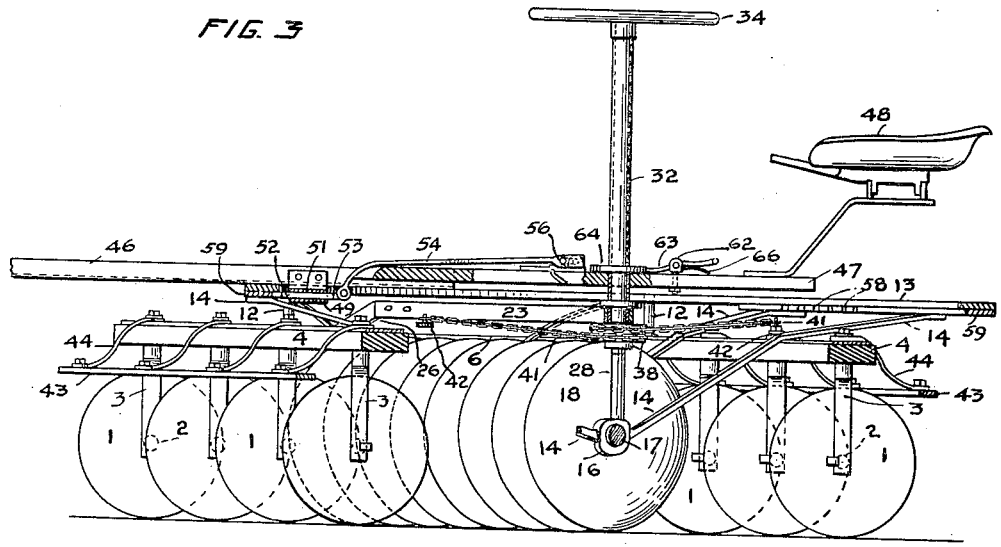
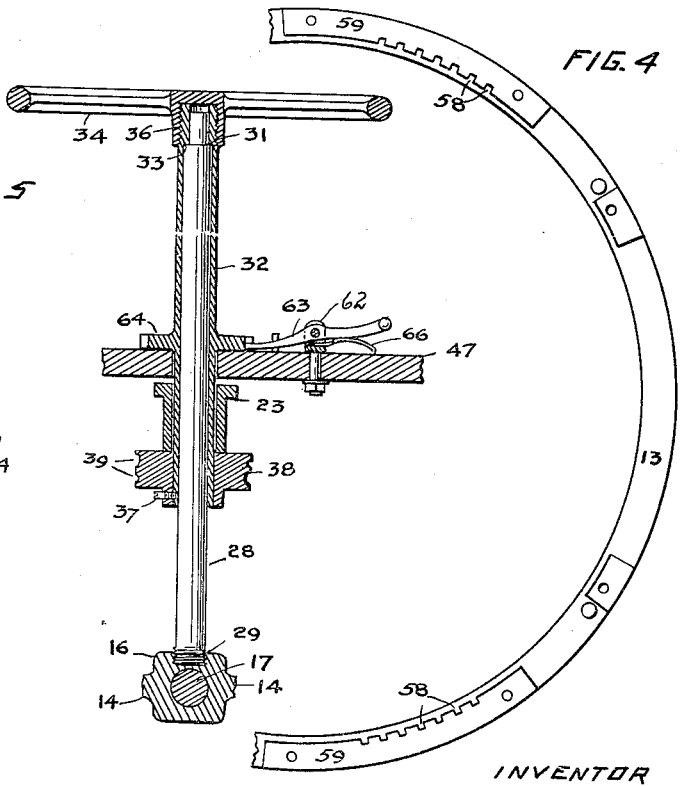
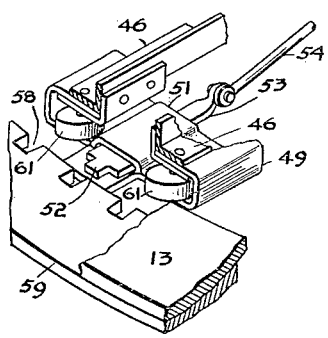
INVENTOR
CHESTER YOUNG
BY Francis M. Wright
ATT'Y

UNITED STATES PATENT OFFICE.

CHESTER YOUNG, OF LIVERMORE, CALIFORNIA.

DISK HARROW.

1,189,332.  Specification of Letters Patent.  Patented July 4, 1916.

Application filed November 20, 1915. Serial No. 62,490.

*To all whom it may concern:*

Be it known that I, CHESTER YOUNG, a citizen of the United States, residing at Livermore, in the county of Alameda and State of California, have invented new and useful Improvements in Disk Harrows, of which the following is a specification.

My invention relates to improvements in disk harrows.

One object of the invention is to provide a disk harrow having a row of colters which cut the ground in advance of the disks and thus facilitate the operation of turning over the ground by the disks, this being especially important in ground in which there is stubble left from a previous harvest.

A further object is to provide means for varying the angle which the planes of the colters make with the planes of the disks of the harrow.

A further object is to provide a disk harrow of the same weight as those heretofore used, the disks of which will cut deeper into the ground.

A further object is to provide means whereby a disk harrow can be readily reversed without the necessity of turning the disks.

A further object is to provide a disk harrow by the use of which there will be no dead furrows, but all the ground will be turned over and left in a substantially uniform condition.

A further object is to provide a disk harrow which will cultivate a wider strip of ground than heretofore.

Figure 1:
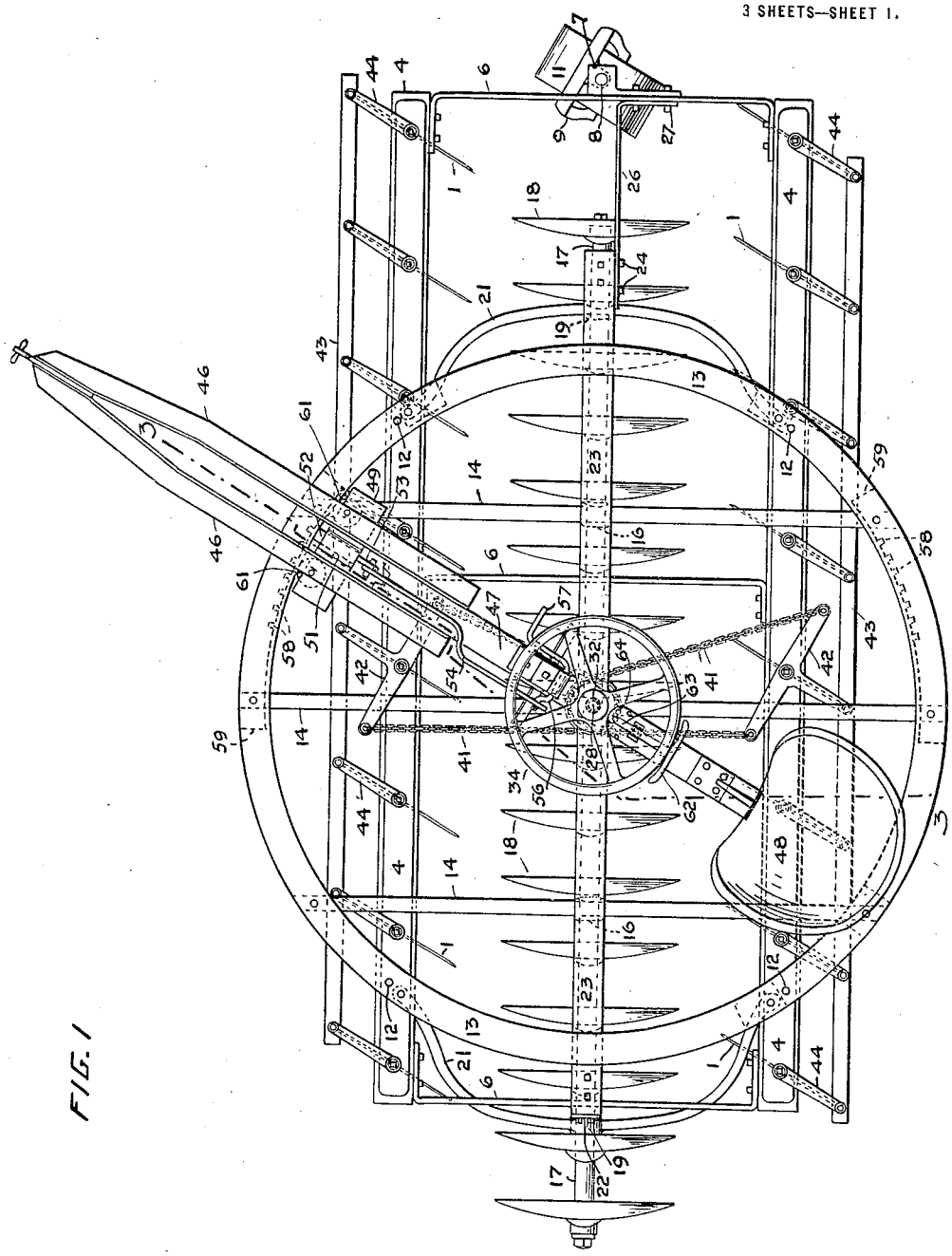
Figure 2:
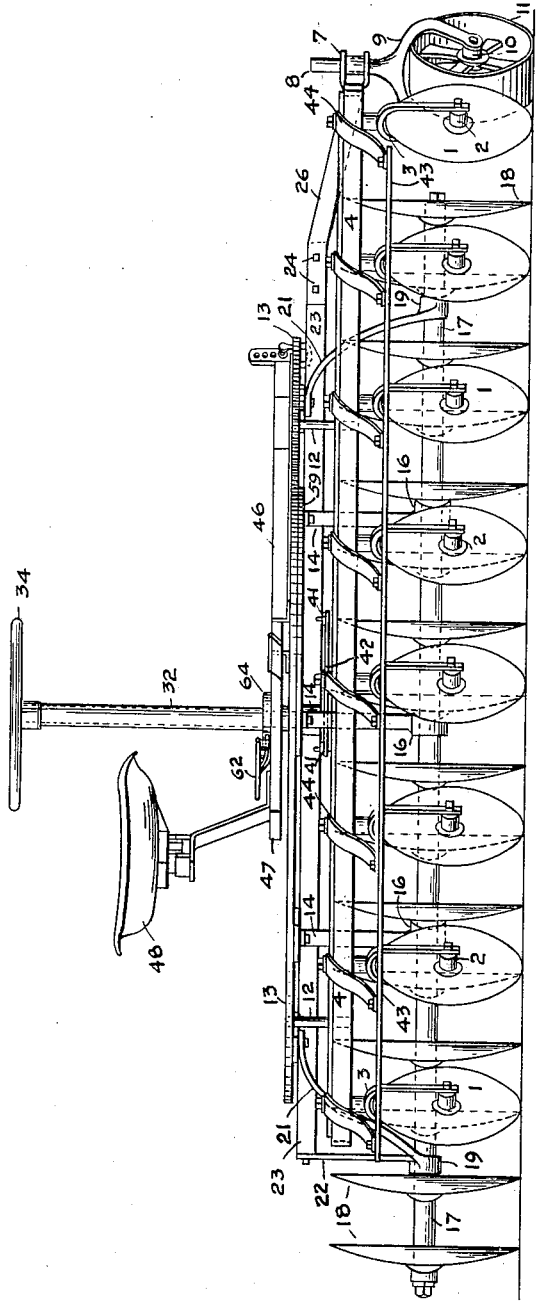

In the accompanying drawing, Figure 1 is a plan view of the disk harrow; Fig. 2 is a rear view thereof; Fig. 3 is a longitudinal vertical section on the line 3—3 of Fig. 1; Fig. 4 is a broken bottom plan view of a controlling ring; Fig. 5 is a vertical section of a shaft for turning the disk harrow; Fig. 6 is a broken perspective view of a latch for locking the controlling means.

Referring to the drawing, 1 indicates circular colters, in two rows, mounted on axles 2, which support forks 3, which in turn support, and have bearings in, parallel transverse bars 4, connected at the centers and ends by the bent ends of iron bars 6, to the center of one end bar of which is secured a bearing 7 for a vertical shaft 8, the lower end of which is forked, as shown at 9, and supported upon the axle 10 of a roller 11.

Supported on said transverse bars 4 by short posts 12 is a controlling ring or frame 13, depending from the under side of which are pairs of parallel hanger bars 14, extending obliquely downward, the bars of each pair being connected at their lower ends to bearings 16 in a line parallel with the transverse bars, through which bearings 16 extends a disk axle 17 on which are mounted harrow disks 18. Said axle 17 also rotates in bearings 19 connected to curved arms 21 extending from the under side of the controlling ring. Extending upwardly from one of said bearings 19, and integral therewith, is a post 22, to which is secured one end of a frame piece 23, the other end of which is secured, as shown at 24, to one end of an iron bar 26, which is bent down and secured at the other end 27 to the adjacent bar 6.

28 indicates a post the lower end of which is screwed, as shown at 29, (Fig. 5) into the central bearing 16, and which passes through a hole in the frame piece 23, said post being at the upper end reduced and forming a shoulder 31. Around said post is a tube 32, having a shoulder 33 supported upon the shoulder 31, a hand wheel 34 being screwed, as shown at 36, upon the upper end of said tube. Around the lower end of said tube 32 is secured by a set screw 37 a reduced portion of a pulley 38, which is formed with two circumferential grooves 39, in which are respectively received chains 41 extending from said pulley in opposite directions to the front and rear of the machine respectively, the ends of said chains being secured to opposite ends of T-shaped levers 42, rigidly secured to the stems of one of the forks 3 in the front and rear transverse bars 4 respectively. To the outer end of the central member of each T-shaped lever is pivotally secured a shifter bar 43, to which shifter bar are also pivotally secured ends of shifter arms 44, the other ends of which are rigidly secured to the stems of the other forks in the adjacent transverse bar. It will be seen that, upon turning the hand wheel 34, all the forks are correspondingly turned about their axes to change the direction of the colters with reference to the frame of the machine.

Resting upon the controlling ring 13 are angle-iron fork members 46 of a draft bar. Secured between said fork members is secured a seat-supporting bar 47, having a hole therethrough through which the post 28 and tube 32 extend upwardly, the rear ends of said bar supporting a seat 48. Secured to said fork members 46 (Fig. 6) is a support 49 for a slideway 51, in which can slide a latch 52 attached to the front end of a rod 53, the rear end of which is attached to an arm 54 of a crank axle 56, another arm 57 of which is capable of being turned by the hand of the operator to withdraw the latch. Said latch 52 can enter any one of two series of notches 58 formed in the inner edge of two segments 59 attached at an interval of about 120° to the under side of the controlling ring. The inner edge of the controlling ring overhangs the inner edge of the segments 59, and also overhangs the latch 52 even when withdrawn from engagement with any notch 58. In said support 49 are mounted, on opposite sides of the latch, rollers 61 which roll against the inner edge of the controlling ring.

To the rear portion of the seat-supporting bar 47 is attached a U-shaped support 62 to which is pivoted a latch 63, the front end of which is adapted to engage any one of a series of notches in a notched wheel 64 formed integral with the tube 32. A spring 66, beneath the rear arm of said latch 63, normally raises said arm and depresses the front end of the latch into engagement with the notch of the wheel 64.

It will be seen that, with this construction, the angle which the disks make with the colters, and with the direction of travel of the harrow, can be varied as desired by turning the wheel and thereby turning all of the shifter arms 44. Furthermore the harrow can readily be reversed, this being accomplished by, first, withdrawing the latches 52 and 63 from the notch with which they are respectively in engagement, second, making the horses drag the shaft bar about the post through an angle of about 120°, third, causing the latch 52 to enter one of the notches 58 in the other segment, so that the draft bar is then locked to the steering ring, then making the horses turn the draft bar, and with it the whole disk harrow, through the supplement of the angle through which it has been already turned, then turning by the hand wheel the colters to conform to the new direction, and then latching it. The disks then make with the direction of travel of the disk harrow the same angle as before but on the other side of said direction; hence, if the cultivating is done upon a side hill, and the travel of the disk harrow is approximately at a uniform level, the front sides of the disks of the harrow are always directed upwardly.

The disks of my improved disk harrow cut deeper into the ground with the same amount of weight as before, because of the fact that colters and disks, the colters being upright and the disks inclined, cut deeper into the ground than disks, of which one set are inclined in one direction and the other are inclined in the opposite direction. Again, there are no dead furrows but all the ground is turned over the left in a uniform condition. Moreover, with ordinary disk harrows one-half the disks are sloped in one direction to hold the harrow and the other half in the other direction to turn over the ground. When the disk harrow is reversed on a side hill one-half of the disks travel backward in the same furrows as have been made already by the other half of the disks. Consequently a disk harrow of ten feet in width will only harrow a strip of ground five feet in width. No part of my improved disk harrow has to cultivate ground which has already been worked by another part so that a disk harrow eight feet in width will cultivate a strip of ground eight feet in width.

I claim:—

1. A disk harrow having a row of disks, two rows of colters respectively in front of and behind the disks, a frame supported upon said disks and colters, a draft bar angularly movable relative to said frame, and means for locking the draft bar in different positions relative to said frame.

2. The combination of a row of disks, a row of colters in front of the disks, shafts for said colters, forks supported by said shafts, a frame supported upon said fork, a post secured to said frame, a tube rotatable around said post, a grooved wheel secured to said tube, a chain around said grooved wheel, arms secured to the forks of said colters, the chain being operatively connected to one of said forks, and operative connections between said arms whereby they rotate in unison.

3. The combination of a row of disks, rows of colters respectively in front of and behind the disks, shafts for said colters, forks supported by said shafts, a frame supported upon said forks, a post secured to said frame, a tube rotatable around said post, a grooved wheel secured to said tube, chains around said grooved wheel, arms secured to the forks of said colters, the chains being operatively connected to one fork in each row of colters, and operative connections between said arms whereby they rotate in unison.

4. The combination of a frame, a row of pivoted colters mounted thereon, a disk axle, disks thereon, a circular controlling ring supported by said colters and disks and secured to the frame, a seat-supporting bar adapted to rotate about the center of the ring, a seat supported thereby, a draft bar connected with the seat-supporting bar and supported by the ring, means for turning the colters about their pivotal axes and a control device at the center of said ring for actuating said means, and means for locking the draft bar to the controlling ring in different positions.

5. The combination of a frame, harrow disks, a shaft about which they revolve mounted on the frame, a bearing for said shaft, a post the lower end of which is supported by said bearing, a seat-supporting bar through which the post extends, a tube around said post also passing through said seat-supporting bar, a hand wheel secured to said tube, a pulley secured to a lower portion of said tube, a frame piece supported by said shaft, and through which said post extends, a flexible member around said pulley, colters rotatably mounted with relation to the frame, and means whereby the movement of said flexible member turns the colters about axes parallel with the planes of the colters.

In testimony whereof I have hereunto set my hand in the presence of two subscribing witnesses.

CHESTER YOUNG.

Witnesses:
F. M. WRIGHT,
D. B. RICHARDS.

Copies of this patent may be obtained for five cents each, by addressing the "Commissioner of Patents, Washington, D. C."